(12) United States Patent
Yanagisawa et al.

(10) Patent No.: US 11,491,936 B2
(45) Date of Patent: Nov. 8, 2022

(54) COLLISION DETECTION DEVICE

(71) Applicant: SUBARU CORPORATION, Tokyo (JP)

(72) Inventors: Wataru Yanagisawa, Tokyo (JP); Issey Syudo, Tokyo (JP); Yuta Kishi, Tokyo (JP); Keisuke Ishigami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 178 days.

(21) Appl. No.: 17/112,453

(22) Filed: Dec. 4, 2020

(65) Prior Publication Data
US 2021/0268979 A1 Sep. 2, 2021

(30) Foreign Application Priority Data

Mar. 2, 2020 (JP) .............................. JP2020-035210

(51) Int. Cl.
*B60R 19/18* (2006.01)
*B60R 19/48* (2006.01)
*B60R 21/0136* (2006.01)

(52) U.S. Cl.
CPC ............ *B60R 19/483* (2013.01); *B60R 19/18* (2013.01); *B60R 21/0136* (2013.01)

(58) Field of Classification Search
CPC . B60R 19/18; B60R 19/483; B60R 2019/186; B60R 2019/1866; B60R 2019/1873; B60R 2019/188; B60R 2019/1886; B60R 21/0136; B60R 2021/0053; G01S 2013/93275
See application file for complete search history.

(56) References Cited

U.S. PATENT DOCUMENTS

| | | | | |
|---|---|---|---|---|
| 9,834,164 B1* | 12/2017 | Iyer | ...................... | B60R 21/38 |
| 2005/0092061 A1* | 5/2005 | Takafuji | .............. | B60R 21/0136 180/274 |
| 2007/0200692 A1* | 8/2007 | Kamel | ...................... | G01L 1/16 180/274 |
| 2008/0122599 A1* | 5/2008 | Suzuki | ................ | B60R 21/0136 340/436 |
| 2009/0322107 A1* | 12/2009 | Takahashi | ........... | B60R 21/0136 293/121 |

(Continued)

FOREIGN PATENT DOCUMENTS

| | | |
|---|---|---|
| JP | 2009-214845 A | 9/2009 |
| JP | 2011-246075 A | 12/2011 |

(Continued)

*Primary Examiner* — Gregory A Blankenship
(74) *Attorney, Agent, or Firm* — McGinn IP Law Group, PLLC

(57) ABSTRACT

A collision detection device includes an impact absorber and a collision detector. The impact absorber extends along a vehicle width direction between a bumper face and a bumper beam of a vehicle, and is configured to absorb impact by being deformed upon collision of the vehicle. The collision detector extends along the vehicle width direction, includes a lower collision detector and an upper collision detector, and is configured to detect that the collision has occurred by being deformed upon the collision of the vehicle. The upper collision detector has greater flexibility than the lower collision detector.

20 Claims, 5 Drawing Sheets

(56) References Cited

U.S. PATENT DOCUMENTS

| | | | |
|---|---|---|---|
| 2013/0079995 A1* | 3/2013 | Kula | G01L 5/0052 |
| | | | 73/862.541 |
| 2013/0147216 A1* | 6/2013 | Kim | B60R 19/18 |
| | | | 293/133 |
| 2015/0274119 A1* | 10/2015 | Schondorf | B60R 19/18 |
| | | | 73/12.01 |
| 2016/0039376 A1* | 2/2016 | Narita | B60R 19/18 |
| | | | 293/4 |
| 2016/0101753 A1* | 4/2016 | Higashimachi | B60R 21/0136 |
| | | | 293/117 |
| 2017/0043735 A1* | 2/2017 | Yamaguchi | B60R 19/18 |
| 2017/0274850 A1* | 9/2017 | Aizawa | B60R 19/18 |
| 2018/0079381 A1* | 3/2018 | Nakane | B60R 21/0136 |
| 2018/0265024 A1* | 9/2018 | Syvertsen | B60R 21/0136 |
| 2019/0023206 A1* | 1/2019 | Yoshida | B60R 21/00 |
| 2020/0223384 A1* | 7/2020 | Kim | B60R 19/483 |
| 2021/0094495 A1* | 4/2021 | Park | B60R 19/18 |
| 2021/0268979 A1* | 9/2021 | Yanagisawa | B60R 19/483 |
| 2022/0032867 A1* | 2/2022 | Kashiwagi | B60R 19/18 |

FOREIGN PATENT DOCUMENTS

| | | | |
|---|---|---|---|
| JP | 2015-081070 A | 4/2015 | |
| WO | WO 2010064546 | * 12/2008 | B60R 19/483 |

* cited by examiner

COLLISION DETECTION DEVICE

CROSS-REFERENCE TO RELATED APPLICATIONS

The present application claims priority from Japanese Patent Application No. 2020-035210 filed on Mar. 2, 2020, the entire contents of which are hereby incorporated by reference.

BACKGROUND

The technology relates to a collision detection device. For example, the technology relates to a collision detection device disposed in front of a bumper beam of a vehicle.

Recent years have seen development of a collision detection device that, when a colliding body collides with a front part of a vehicle, detects the collision. The collision detection device includes an impact absorber and an impact detector disposed in front of a bumper beam of the vehicle. The impact absorber absorbs impact of collision, and the impact detector detects the impact of the collision. On the basis of the impact detected by the impact detector, an airbag provided in a front part of the vehicle is deployed. This enables the airbag to protect the colliding body.

Such an impact detector can cause the airbag to be deployed even in a case of a small animal, for example, other than a protection target, which can obstruct a driver's sight. Therefore, what is desired upon collision is distinguished detection of objects that have collided.

As an example technique for the distinguished detection, Japanese Unexamined Patent Application Publication (JP-A) No. 2009-214845 discloses a vehicle collision detection device that prevents erroneous collision determination. The vehicle collision detection device has a chamber member with a pressure sensor disposed in its internal space. On a front side of a vehicle, the chamber member has an inclined surface whose normal line is directed diagonally upward. This significantly reduces external force applied to the chamber member upon minor collision. This makes it possible to detect and distinguish between impact applied when a person has collided and impact applied when a light colliding body has collided.

JP-A No. 2011-246075 discloses a pedestrian collision detection device that is able to detect collision between a vehicle and a pedestrian with high accuracy. For example, in JP-A No. 2011-246075, an upper surface and a lower surface of a pressure chamber that detects collision may each have a thick part, which enables an amount of deformation of the pressure chamber to be controlled. This makes it possible to improve accuracy of collision detection based on deformation of the pressure chamber.

JP-A No. 2015-81070 discloses a technique of making, in a vehicle collision detection device including a detection tube member, a thickness of the detection tube member larger than a thickness of a front wall provided as another member. This is expected to enable detection to be performed using the detection tube member with high accuracy.

SUMMARY

An aspect of the technology provides a collision detection device including an impact absorber and a collision detector. The impact absorber extends along a vehicle width direction between a bumper face and a bumper beam of a vehicle, and is configured to absorb impact by being deformed upon collision of the vehicle. The collision detector extends along the vehicle width direction, includes a lower collision detector and an upper collision detector, and is configured to detect that the collision has occurred by being deformed upon the collision of the vehicle. The upper collision detector has greater flexibility than the lower collision detector.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

DETAILED DESCRIPTION

Figure 1A:
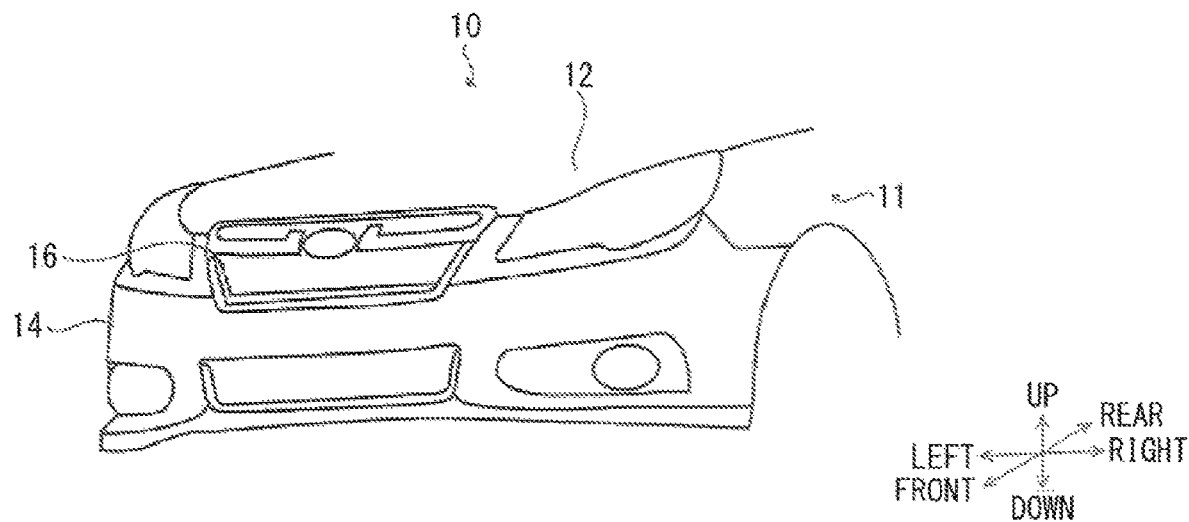
FIG. 1A is a perspective view of a front part of a vehicle including a collision detection device according to one example embodiment of the technology.

The collision detection device has room for improvement in terms of improving detection accuracy of collision.

For example, collisions that occur at a front part of a vehicle include pedestrian collision and minor collision. The pedestrian collision refers to collision of a pedestrian with the front part of the vehicle. The minor collision refers to collision of an object other than the pedestrian, for example, a small animal, with the front part of the vehicle. Impact is applied to a collision detector in different directions between a case where the pedestrian collision occurs and a case where the minor collision occurs. However, it has not been easy for the collision detection devices disclosed in JP-A Nos. 2009-214845, 2011-246075, and 2015-81070, described above, to clearly detect and distinguish between the pedestrian collision and the minor collision.

To detect and distinguish between the pedestrian collision and the minor collision, a spacer exhibiting different deformation characteristics between the pedestrian collision and the minor collision may be provided between a bumper face and the collision detector. However, upon occurrence of the pedestrian collision, the spacer can partly be uncrushed, which makes it difficult to sufficiently protect the pedestrian from impact.

It is desirable to provide a collision detection device that makes it possible to clearly detect and distinguish between pedestrian collision and minor collision.

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

A vehicle 10 including a collision detection device 11 according to an example embodiment of the technology will be described in detail with reference to the drawings. The following may use, for description, a longitudinal or front-rear direction, a vertical or up-down direction, and a left-right direction. The "left" and the "right" may refer to the left and the right in a case where the vehicle 10 is viewed from the front. In the following description, pedestrian collision may refer to collision of a pedestrian 26 with a front part of the vehicle 10, and minor collision may refer to collision of a small animal 27, for example, other than the pedestrian 26 with the front part of the vehicle 10.

Figure 1B:
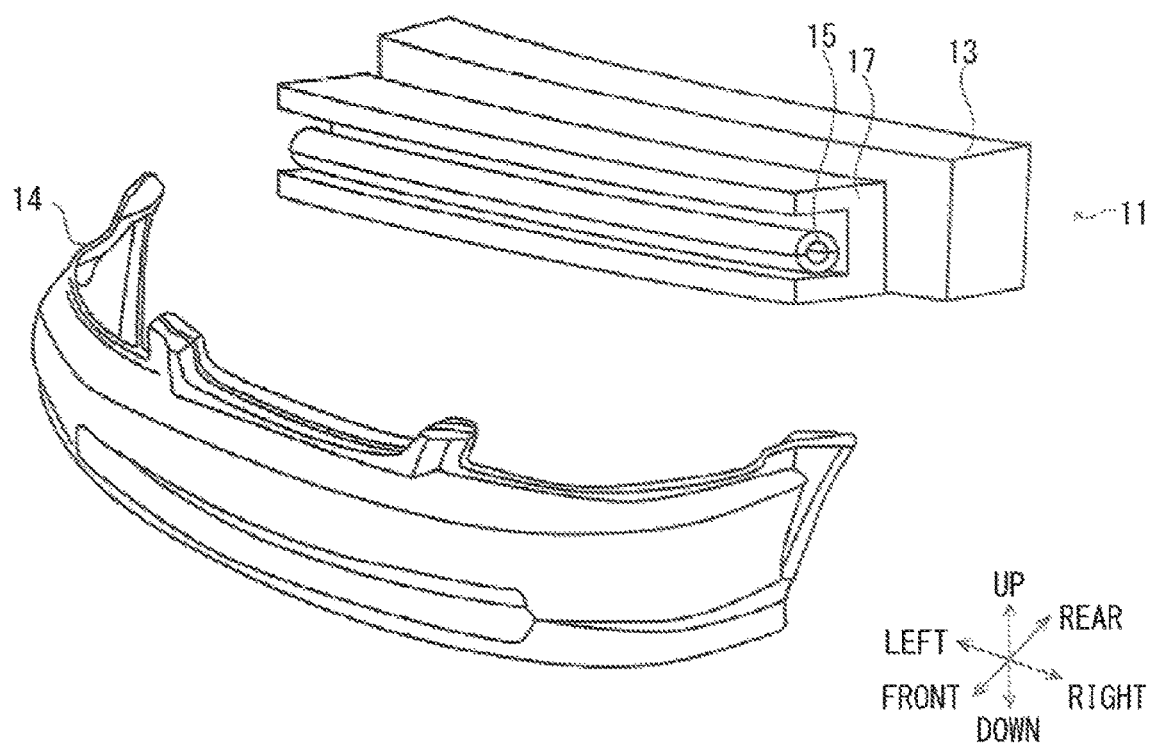
FIG. 1B is an exploded perspective view of the collision detection device, for example, of the vehicle illustrated in FIG. 1A.

FIG. 1A is a perspective view of the front part of the vehicle 10. FIG. 1B is an exploded perspective view of the collision detection device 11, for example.

As illustrated in FIG. 1A, a design or appearance of the front part of the vehicle 10 may include, in order from the top, a front hood 12, a grille 16, and a bumper face 14. Members included in the collision detection device 11 according to the example embodiment may be provided in the rear of the grille 16 or the bumper face 14. When the collision detection device 11 detects that the vehicle 10 has collided with the pedestrian 26, an electronic control unit (ECU) 20 to be described later may deploy an airbag 22 (unillustrated) to protect the pedestrian 26 from secondary collision. The airbag 22 may be disposed in the vicinity of the front hood 12. In addition, a pop-up hood 23 (unillustrated) may be operated to raise a rear part of the front hood 12 upward, thereby reducing impact to be applied to a head of the pedestrian 26. The airbag 22 and the pop-up hood 23 may both be used. Alternatively, either one of the airbag 22 and the pop-up hood 23 may be used.

As illustrated in FIG. 1B, the collision detection device 11 includes an impact absorber 17 and a collision detector 15. The impact absorber 17 extends along a vehicle width direction between the bumper face 14 and a bumper beam 13 of the vehicle 10, and absorbs impact by being deformed upon collision of the vehicle 10. The collision detector 15 extends along the vehicle width direction, and detects that collision has occurred by being deformed upon collision of the vehicle 10. As will be described later with reference to FIG. 2B, the collision detector 15 includes a lower collision detector 152 and an upper collision detector 151 having greater flexibility than the lower collision detector 152.

The impact absorber 17 may include a resin foam material, such as polypropylene foam, or a resin material, such as polypropylene. The impact absorber 17 may be provided continuously from a left end side to a right end side of the vehicle 10. The impact absorber 17 may be attached to a front surface of the bumper beam 13 to be described later.

The collision detector 15 may be provided in front of the impact absorber 17, and may substantially have a tube shape. An example shape of the collision detector 15 will be described later with reference to FIGS. 2A and 2B, for example. The collision detector 15 may be deformed to be crushed upon occurrence of the pedestrian collision and the minor collision. A detection device 18 to be described later may sense an amount of deformation of the collision detector 15, thereby detecting the pedestrian collision or the minor collision. For example, the detection device 18 to be described later may sense the amount of deformation of the collision detector 15 by detecting a pressure change inside the collision detector 15, or a change in flow velocity or flow rate, for example, of air released to the outside from the collision detector 15. As the detection device 18, pressure sensors disposed on both end sides of the collision detector 15 may be used, for example.

The bumper beam 13 may extend in the width direction of the vehicle 10. The bumper beam 13 may be a tubular member including a metal plate and having a substantially rectangular cross-section. The bumper beam 13 may be configured to support the impact absorber 17, for example, and absorb energy generated upon severe collision. Upon the pedestrian collision or the minor collision, the bumper beam 13 may support the collision detection device 11 from the rear, basically without being deformed.

Figure 2A:
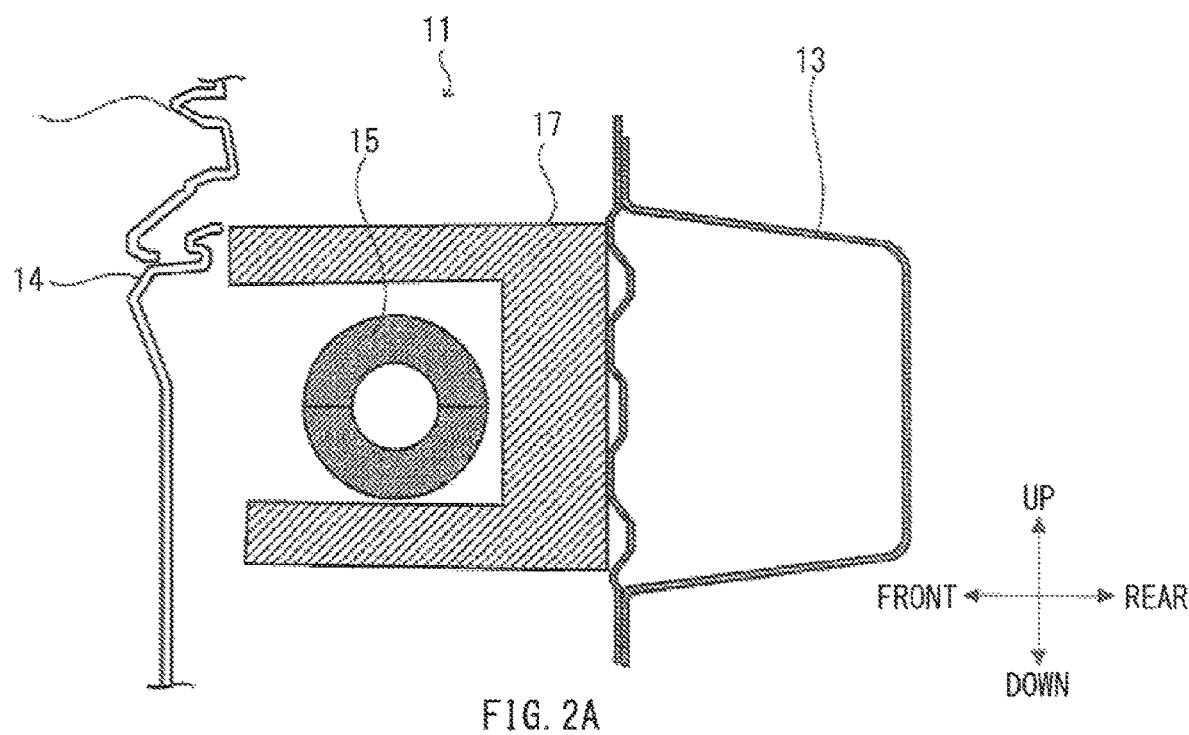
FIG. 2A is a side cross-sectional view of the collision detection device according to one example embodiment of the technology.
Figure 2B:
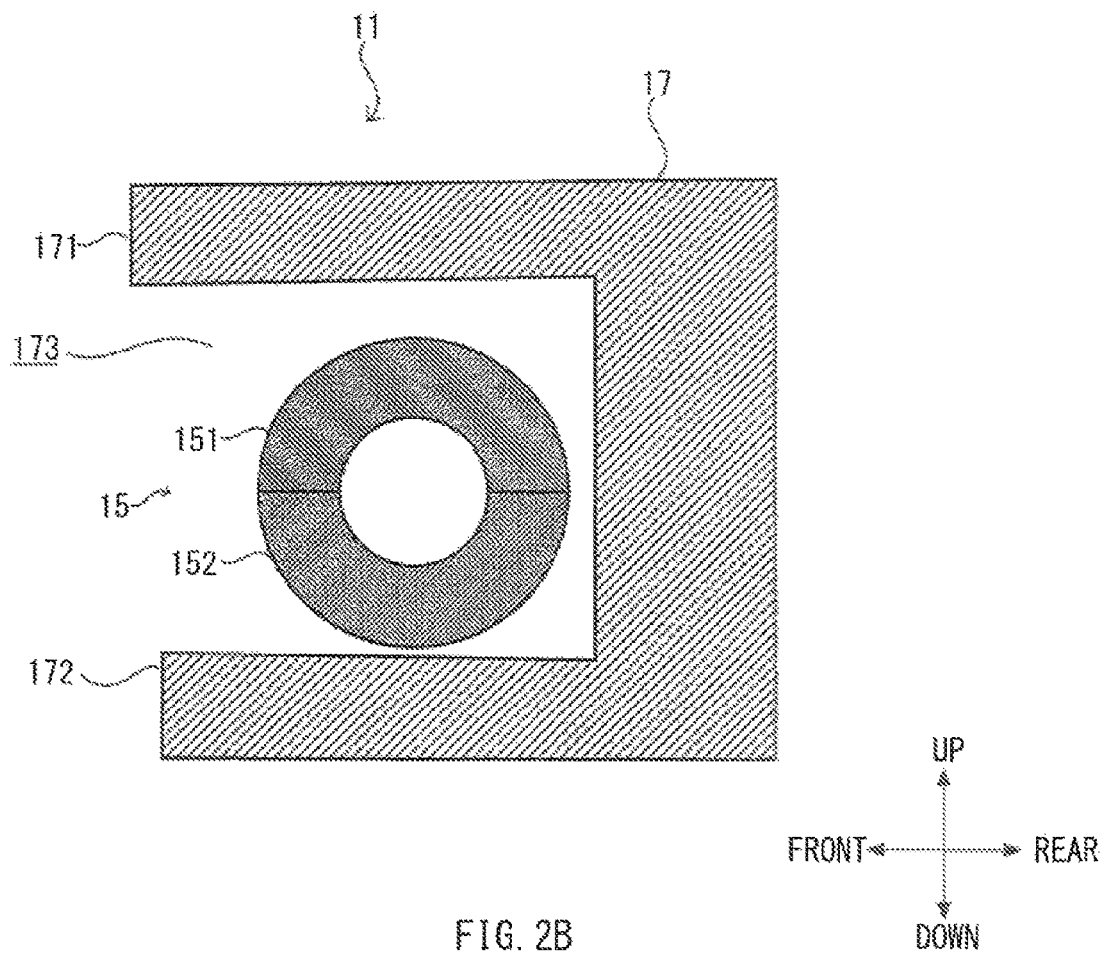
FIG. 2B is an enlarged side cross-sectional view of a portion provided with a collision detector of the collision detection device illustrated in FIG. 2A.

A configuration of the collision detection device 11 will be described in detail with reference to FIGS. 2A and 2B. FIG. 2A is a side cross-sectional view of the collision detection device 11. FIG. 2B is an enlarged side cross-sectional view of a portion provided with the collision detector 15.

As illustrated in FIG. 2A, the impact absorber 17 may be disposed between the front surface of the bumper beam 13 and a rear surface of the bumper face 14.

As illustrated in FIG. 2B, the impact absorber 17 may include an upper impact absorber 171, a lower impact absorber 172, and an accommodation region 173. The accommodation region 173 may be recessed rearward from a front surface of the impact absorber 17, and may have capacity enough to accommodate the collision detector 15. The upper impact absorber 171 and the lower impact absorber 172 may be an upper end and a lower end of the impact absorber 17 that protrude frontward. The collision detector 15 may be placed on an upper surface of the lower impact absorber 172.

The collision detector 15 may be a tube member having a substantially annular cross-section in a situation in which no compressive force is applied. The collision detector 15 may include the upper collision detector 151 and the lower collision detector 152. The lower collision detector 152 and the upper collision detector 151 may be formed by two-color molding. This makes it possible to easily manufacture the collision detector 15 including the upper collision detector 151 and the lower collision detector 152 that differ in flexibility.

The upper collision detector 151 and the lower collision detector 152 may differ in rigidity. The upper collision detector 151 may include a material having greater flexibility than that of the lower collision detector 152. In other words, the lower collision detector 152 may include a material having higher rigidity than that of the upper collision detector 151. The upper collision detector 151 may include ethylene-propylene rubber (EPDM) as an example material, and the lower collision detector 152 may include polypropylene (PP) as an example material.

A boundary between the lower collision detector 152 and the upper collision detector 151 may be present at substantially the middle of the collision detector 15 in the vertical direction. This configuration enables the flexible upper collision detector 151 to undergo great compressive deformation upon occurrence of the pedestrian collision. In contrast, the lower collision detector 152 is enabled to exert large stress upon occurrence of the minor collision, making compressive deformation of the collision detector 15 smaller. This enables an amount of compressive deformation to greatly differ between the pedestrian collision and the minor collision, making it possible to clearly detect and distinguish between the pedestrian collision and the minor collision.

At the boundary between the lower collision detector 152 and the upper collision detector 151, a surface of the lower collision detector 152 and a surface of the upper collision detector 151 may be continuous with each other. The collision detector 15 may have a substantially annular cross-sectional shape. For example, an outer surface at the boundary between the upper collision detector 151 and the lower collision detector 152 may configure, in cross-section, a part of a circle. This facilitates deformation upon occurrence of the pedestrian collision, and also makes it possible to keep rigidity in the longitudinal direction at a certain level or more upon occurrence of the minor collision.

In a situation in which no collision has occurred, front ends of the upper impact absorber 171 and the lower impact absorber 172 may be positioned in front of a front end of the collision detector 15. With this configuration, upon occurrence of the pedestrian collision and the minor collision, the impact absorber 17 may undergo compressive deformation in the longitudinal direction, while the collision detector 15 effectively detects the collision. This makes it possible to protect the pedestrian 26 and the small animal 27 to be described later from the collision.

Figure 3:
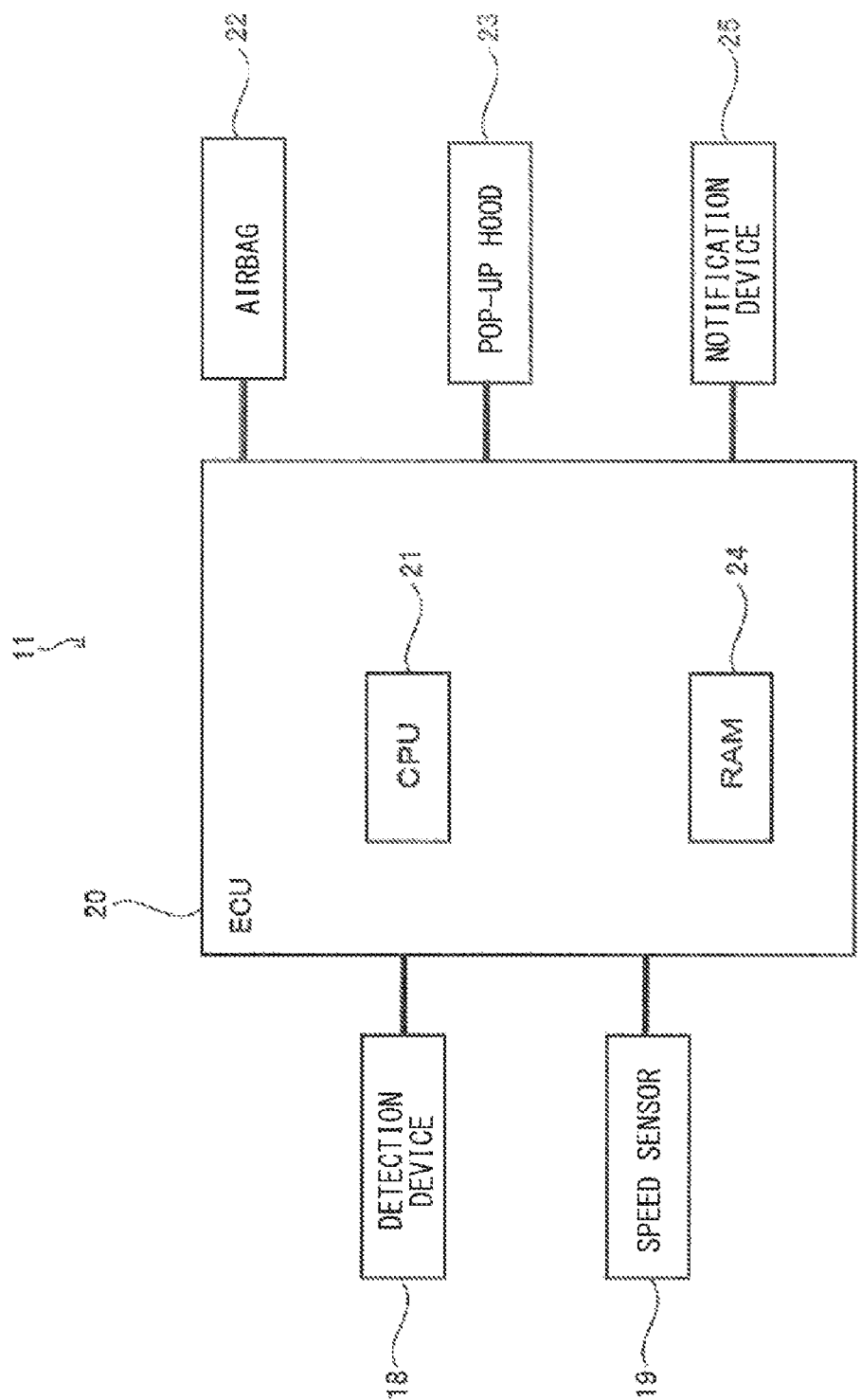
FIG. 3 is a block diagram illustrating a connection configuration of the collision detection device according to one example embodiment of the technology.

FIG. 3 is a block diagram illustrating a connection configuration of the collision detection device 11. The collision detection device 11 may include the ECU 20, the detection device 18, a speed sensor 19, the airbag 22, the pop-up hood 23, and a notification device 25.

The ECU 20 may be an arithmetic controller including a CPU 21 and a RAM 24. The ECU 20 may have an output terminal and an input terminal. The detection device 18 and the speed sensor 19 may be coupled to the input terminal of the ECU 20. The airbag 22, the pop-up hood 23, and the notification device 25 may be coupled to the output terminal of the ECU 20. The ECU 20 may execute predetermined arithmetic processing, on the basis of input information inputted from the detection device 18 and the speed sensor 19, for example. The ECU 20 may thus output an output signal to be used to control operation of the airbag 22, the pop-up hood 23, and the notification device 25, for example.

As described above, the detection device 18 may input, to the ECU 20, an electric signal corresponding to internal pressure, for example, of the collision detector 15. The ECU 20 may determine that the pedestrian collision has occurred if an internal pressure change of the collision detector 15 detected by the detection device 18 is equal to or more than a certain level. The ECU 20 may determine that the minor collision has occurred if the pressure change is less than the certain level.

On the basis of a rotation speed of a wheel, for example, the speed sensor 19 may input an electric signal indicating a traveling speed of the vehicle 10 to the ECU 20. In a case where the traveling speed of the vehicle 10 detected by the speed sensor 19 is equal to or less than a certain level and the pedestrian collision occurs, the ECU 20 may deploy the airbag 22 and activate the pop-up hood 23, to protect the pedestrian 26.

The airbag 22 and the pop-up hood 23 may be configured as described with reference to FIGS. 1A and 1B. To protect the pedestrian 26 upon occurrence of the pedestrian collision, the airbag 22 may be deployed and the pop-up hood 23 may be displaced to rise, on the basis of an instruction from the ECU 20.

The notification device 25 may perform predetermined display or sound output to notify an occupant riding in the vehicle 10 that the pedestrian collision or the minor collision has occurred.

Figure 4A:
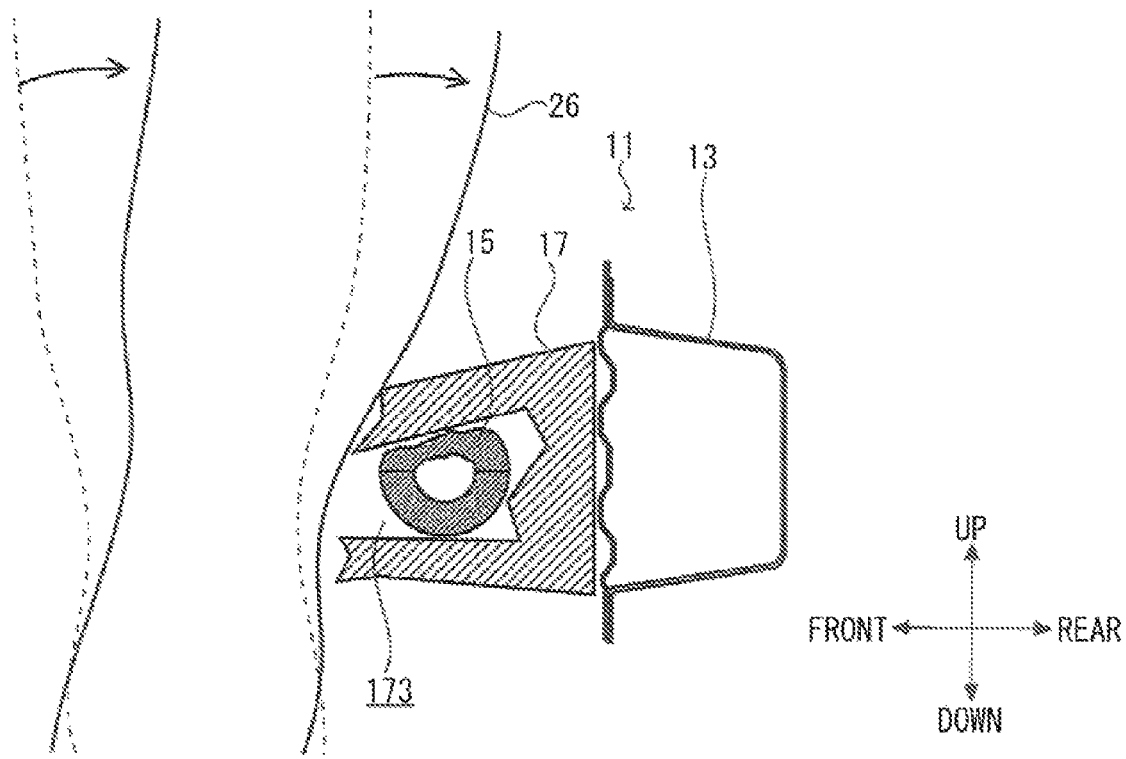
FIG. 4A is a side cross-sectional view of a behavior exhibited by the collision detection device according to one example embodiment of the technology upon occurrence of pedestrian collision.
Figure 4B:
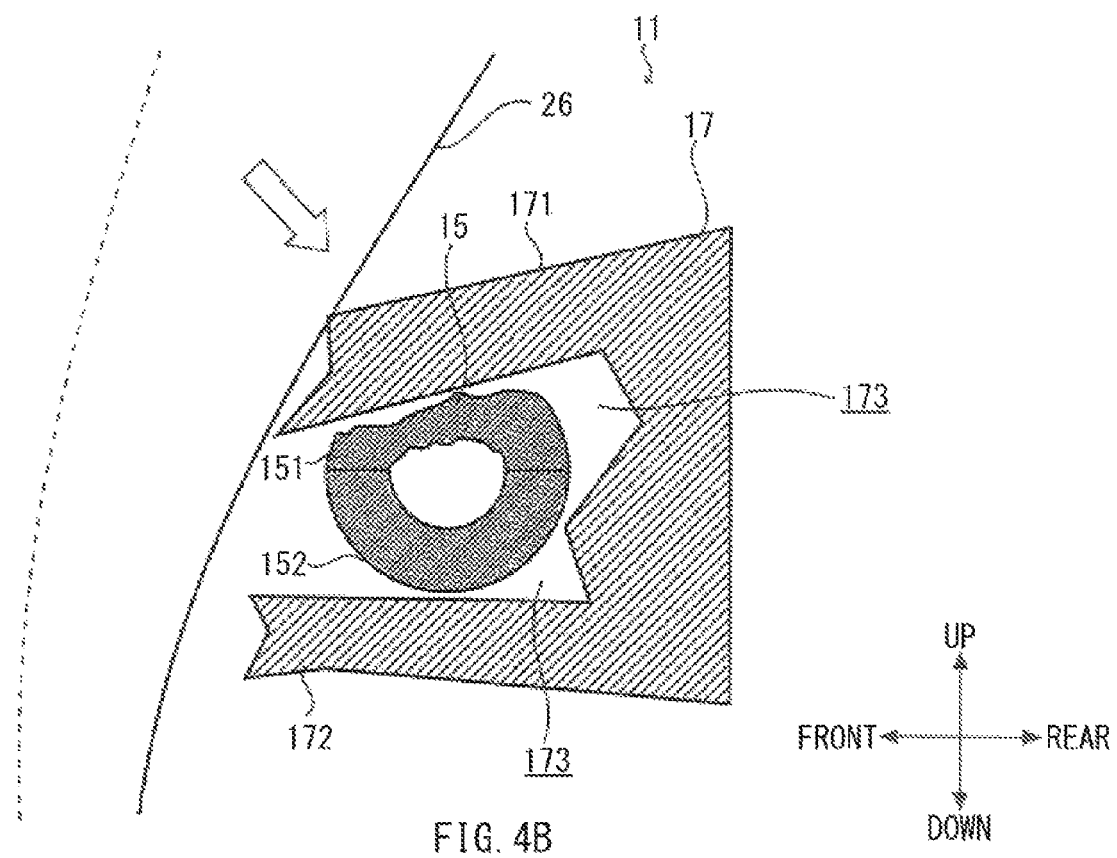
FIG. 4B is a detailed side cross-sectional view of how the collision detector of the collision detection device illustrated in FIG. 4A is deformed.
Figure 5A:
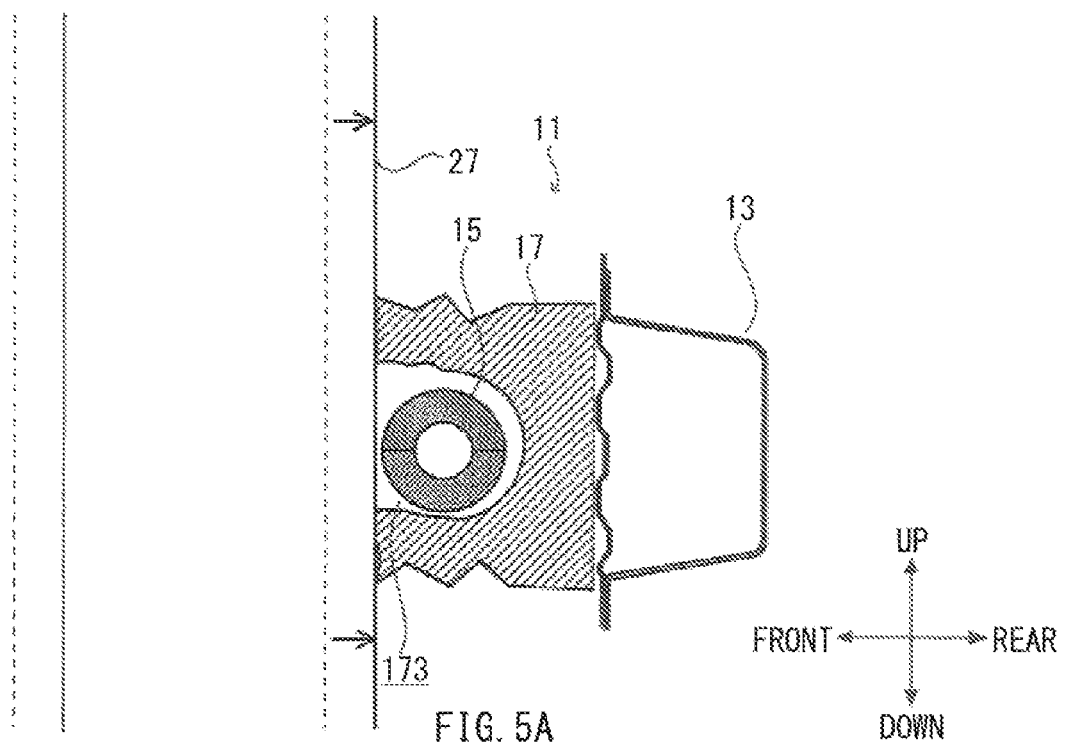
FIG. 5A is a side cross-sectional view of a behavior exhibited by the collision detection device according to one example embodiment of the technology upon occurrence of minor collision.
Figure 5B:
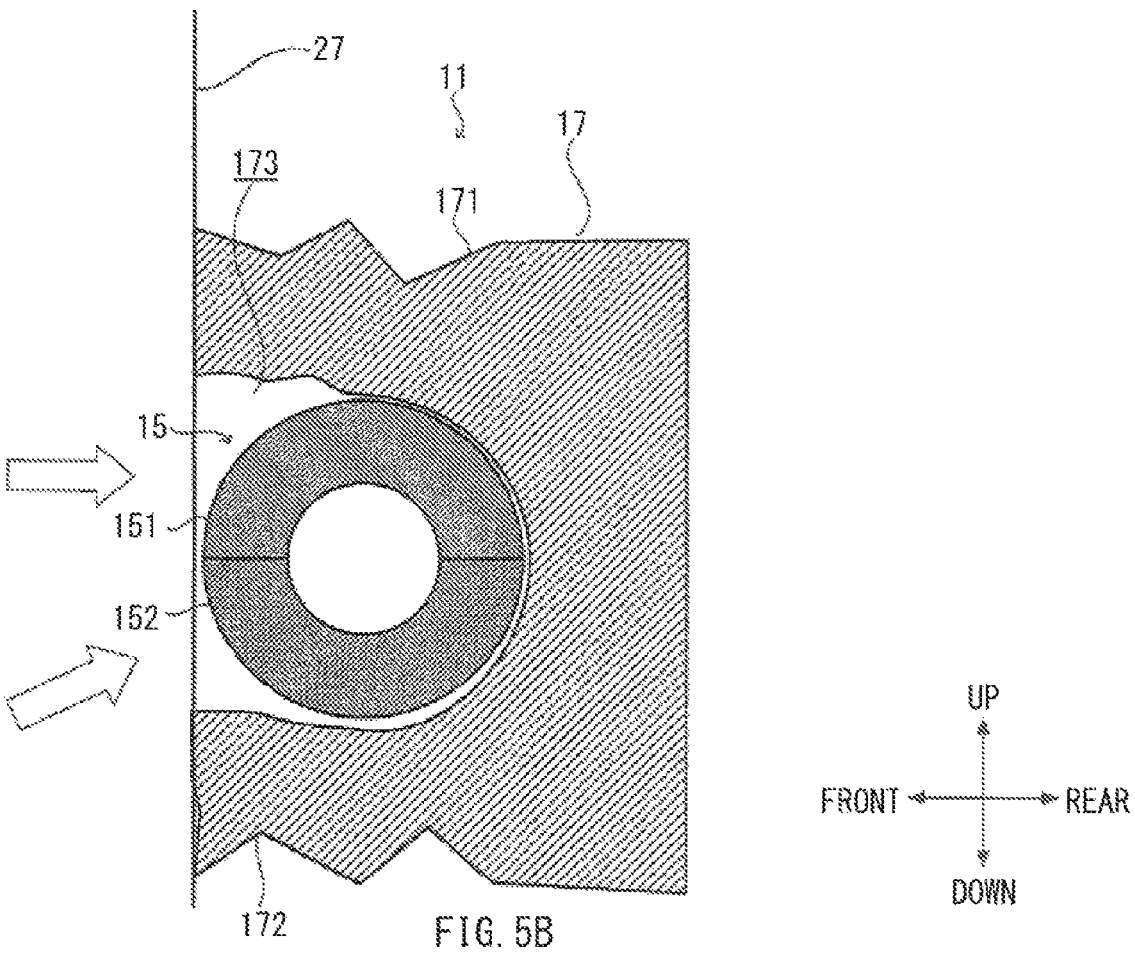
FIG. 5B is a detailed side cross-sectional view of how the collision detector of the collision detection device illustrated in FIG. 5A is deformed.

Behaviors exhibited by the collision detection device 11 upon occurrence of the pedestrian collision and the minor collision will be described with reference to FIGS. 4A and 4B and FIGS. 5A and 5B. FIGS. 4A and 4B illustrate the behavior exhibited by the collision detection device 11 upon occurrence of the pedestrian collision. FIGS. 5A and 5B illustrate the behavior exhibited by the collision detection device 11 upon occurrence of the minor collision.

The behavior exhibited by the collision detection device 11 upon occurrence of the pedestrian collision will be described with reference to FIGS. 4A and 4B. FIG. 4A is a side cross-sectional view of the behavior exhibited by the collision detection device 11 upon occurrence of the pedestrian collision. FIG. 4B is a detailed side cross-sectional view of how the collision detector 15 is deformed. For simplification of the drawings, the bumper face 14 and the grille 16 illustrated in FIG. 2A are not illustrated in FIGS. 4A and 4B.

As illustrated in FIG. 4A, upon occurrence of the pedestrian collision, e.g., collision of the pedestrian 26 with the front part of the vehicle 10, the bumper face 14 and the grille 16 illustrated in FIG. 2A may be deformed rearward. In addition, the impact absorber 17 and the collision detector 15 may be deformed rearward. Impact energy is absorbed by the impact absorber 17 being deformed to be compressed in the longitudinal direction, making it possible to lessen impact applied to a leg, for example, of the pedestrian 26.

Upon occurrence of the pedestrian collision, the collision detector 15 may undergo great compressive deformation. As illustrated in FIG. 3, the ECU 20 may thus detect that the pedestrian collision has occurred, on the basis of detection by the detection device 18 that the amount of deformation, for example, an amount of pressure change or an amount of discharged air, of the collision detector 15 has exceeded a predetermined value.

In response to the detection, the ECU 20 may deploy the airbag 22 illustrated in FIG. 3, and bring the pop-up hood 23 into operation. This enables the pedestrian 26 to be caught by the airbag 22 and the front hood 12, making it possible to protect the pedestrian 26 effectively. The ECU 20 may also use the notification device 25 to notify the occupant that the pedestrian collision has occurred.

As illustrated in FIG. 4B, upon occurrence of the pedestrian collision, the amount of compressive deformation of the collision detector 15 may become large. For example, impact applied from the pedestrian 26 to the collision detector 15 upon occurrence of the pedestrian collision may be directed downward and rearward, as indicated by an arrow.

This impact may cause the upper impact absorber 171 of the impact absorber 17 to fall downward, with the vicinity of its rear end serving as a supporting point, to press the collision detector 15 from above. In contrast, the lower impact absorber 172 may fall downward by a smaller amount, because of not being greatly influenced by the impact. The lower impact absorber 172 may thus support the collision detector 15 from below.

As described above, the collision detector 15 may include the upper collision detector 151 excellent in flexibility and the lower collision detector 152 excellent in rigidity. Therefore, when the upper impact absorber 171 presses the collision detector 15 from above, the upper collision detector 151 may undergo great downward compressive deformation. In contrast, an amount of compressive deformation of the lower collision detector 152 may be smaller than that of the upper collision detector 151.

In sensing the pedestrian collision, the collision detector 15 may favorably detect the pedestrian collision by causing elastic deformation. On the other hand, the collision detector 15 may have undergone plastic deformation immediately after the occurrence of the pedestrian collision, and no resilient force may be applied from the collision detector 15.

The behavior exhibited by the collision detection device 11 upon occurrence of the minor collision will be described with reference to FIGS. 5A and 5B. FIG. 5A is a side cross-sectional view of the behavior exhibited by the collision detection device 11 upon occurrence of the minor collision. FIG. 5B is a detailed side cross-sectional view of how the collision detector 15 is deformed.

As illustrated in FIG. 5A, upon occurrence of the minor collision, e.g., collision of the small animal 27, for example, with the front part of the vehicle 10, the bumper face 14 and the grille 16 illustrated in FIG. 2A may be deformed rearward. In addition, the impact absorber 17 and the collision detector 15 may be deformed rearward. Impact energy is absorbed by the impact absorber 17 being deformed, making it possible to lessen impact applied to the small animal 27.

The small animal 27 may have a lower center of gravity than the pedestrian 26 described above. As illustrated in FIG. 5B, a direction of impact applied upon occurrence of the minor collision may thus be substantially parallel to the longitudinal direction, as indicated by an arrow. Alternatively, in a case where the small animal 27, for example, that has collided is small, the application direction of the impact may be directed upward and rearward, as indicated by an arrow.

In such a case, first, impact energy generated by the small animal 27 colliding with the front part of the vehicle 10 may act on the front end of the upper impact absorber 171 and the front end of the lower impact absorber 172. The upper impact absorber 171 and the lower impact absorber 172 may undergo compressive deformation in the longitudinal direction while the absorbing impact. The impact energy may act also on the collision detector 15 from the front. However, the lower collision detector 152 excellent in rigidity may exert large stress in the longitudinal direction, preventing the collision detector 15 from undergoing great compressive deformation in the longitudinal direction.

Upon occurrence of the minor collision, the front ends of the upper impact absorber 171 and the lower impact absorber 172 may be positioned in front of the front end of the collision detector 15. This configuration makes it less likely for the collision detector 15 to undergo great compressive deformation upon occurrence of the minor collision.

According to the above description, upon occurrence of the minor collision, the collision detector 15 may undergo crush deformation to some extent. However, the amount of deformation thereof may be significantly smaller as compared with deformation caused upon occurrence of the pedestrian collision. Therefore, pressure fluctuation, for example, inside the collision detector 15 may also be small.

In sensing the minor collision, the collision detector 15 may favorably detect the minor collision by causing relatively small elastic deformation. On the other hand, the collision detector 15 may have undergone plastic deformation immediately after the occurrence of the minor collision, and no resilient force may be applied from the collision detector 15.

Upon occurrence of the minor collision, the ECU 20 may detect that the minor collision has occurred, on the basis of detection by the detection device 18 that the amount of deformation, for example, the amount of pressure change or the amount of discharged air, of the collision detector 15 has not exceeded the predetermined value. The ECU 20 may also use the notification device 25 to notify the occupant that the minor collision has occurred.

Thereafter, the ECU 20 may refrain from deploying the airbag 22 and refrain from bringing the pop-up hood 23 into operation. This makes it possible to prevent the occupant's sight from being obstructed by the airbag 22 and the pop-up hood 23 being activated inadvertently.

Example effects to be provided by the example embodiments described above will now be described.

In the collision detection device 11 according to the example embodiment, the upper collision detector 151 of the collision detector 15 has greater flexibility than the lower collision detector 152. This results in a large amount of deformation of the upper collision detector 151 upon occurrence of the pedestrian collision, making it possible to detect the pedestrian collision accurately. The lower collision detector 152 of the collision detector 15 may include a rigid material. This makes it possible to reduce the amount of deformation of the collision detector 15 to be caused upon the minor collision, and makes it less likely for the minor collision to be erroneously detected as the pedestrian collision.

In the collision detection device 11 according to some example embodiments, the collision detector 15 may have a substantially annular cross-sectional shape. Thus, upon occurrence of collision of the vehicle 10, the collision detector 15 is able to be stably deformed, and accurately detect that the collision has occurred.

In the collision detection device 11 according to some example embodiments, the boundary between the upper collision detector 151 and the lower collision detector 152 may be present at substantially the middle of the collision detector 15 in the vertical direction. This enables a sufficient amount of deformation to be caused upon occurrence of the pedestrian collision, and enables sufficient stress to be exerted upon occurrence of the minor collision.

In the collision detection device 11 according to some example embodiments, the upper collision detector 151 and the lower collision detector 152 may be formed by two-color molding. This makes it possible to easily form the collision detector 15 including the upper collision detector 151 and the lower collision detector 152.

In the collision detection device 11 according to some example embodiments, the surface of the lower collision detector 152 and the surface of the upper collision detector 151 may be continuous with each other. Thus, upon occurrence of collision, it is possible to detect the collision in both a case where impact has been applied from the front upon the minor collision and a case where impact has been applied from an upper front direction upon the pedestrian collision.

In the collision detection device 11 according to some example embodiments, the accommodation region 173 may accommodate the collision detector 15. Upon occurrence of the pedestrian collision, the upper impact absorber 171 may fall downward to cause the impact absorber 17 to suitably undergo compressive deformation. Upon occurrence of the minor collision, the upper impact absorber 171 and the lower impact absorber 172 may exert stress in the longitudinal direction, which makes it possible to prevent compressive deformation of the impact absorber 17.

In the collision detection device 11 according to some example embodiments, upon occurrence of the minor collision, the front ends of the upper impact absorber 171 and the lower impact absorber 172 may be positioned in front of the front end of the collision detector 15. This makes it possible to reduce the amount of compression of the collision detector 15 upon occurrence of the minor collision.

Some example embodiments of the disclosure have been described above. The example embodiments of the disclosure are not limited to these example embodiments and may be modified within the scope of the technology. The example embodiments described above may be combined as appropriate.

For example, in some example embodiments, a tube member may be used as the collision detector 15, as illustrated in FIG. 1B. In another example, a chamber member may be used as the collision detector 15. In a case of using the tube member as the collision detector 15, its cross-sectional shape is not limited to a circular shape, and may be a polygonal shape such as a quadrangle.

As illustrated in FIG. 1B, in the above description, the pedestrian collision and the minor collision may be detected on the basis of the internal pressure change or the change in flow rate of discharged air of the collision detector 15. In another example, optical fiber, for example, whose output changes depending on deformation caused upon collision may be used as the collision detector 15.

Referring to FIG. 2B, the lower collision detector 152 may be made relatively thicker than the upper collision detector 151. This enables the effect of detecting and distinguishing between the pedestrian collision and the minor collision to be exerted significantly.

Referring to FIG. 2B, a lower surface of the lower collision detector 152 may be ribbed, or the lower collision detector 152 may partially or entirely be made thick. This makes it possible to further improve the rigidity of the lower collision detector 152.

A front end of the upper surface of the lower impact absorber 172 may be caused to protrude upward to form a protrusion. With this configuration, the protrusion may limit frontward movement of the collision detector 15. This makes it possible to prevent the collision detector 15 from being detached from the accommodation region 173 of the impact absorber 17 due to vibration, for example.

The invention claimed is:

1. A collision detection device comprising:
   an impact absorber extending along a vehicle width direction between a bumper face and a bumper beam of a vehicle, and configured to absorb impact by being deformed upon collision of the vehicle; and
   a collision detector extending along the vehicle width direction, including a lower collision detector and an upper collision detector, and configured to detect that the collision has occurred by being deformed upon the collision of the vehicle, the upper collision detector having greater flexibility than the lower collision detector.

2. The collision detection device according to claim 1, wherein the collision detector has a substantially annular cross-sectional shape.

3. The collision detection device according to claim 1, wherein a boundary between the lower collision detector and the upper collision detector is present at substantially a middle of the collision detector in a vertical direction.

4. The collision detection device according to claim 2, wherein a boundary between the lower collision detector and the upper collision detector is present at substantially a middle of the collision detector in a vertical direction.

5. The collision detection device according to claim 1, wherein the lower collision detector and the upper collision detector are formed by two-color molding.

6. The collision detection device according to claim 2, wherein the lower collision detector and the upper collision detector are formed by two-color molding.

7. The collision detection device according to claim 3, wherein the lower collision detector and the upper collision detector are formed by two-color molding.

8. The collision detection device according to claim 4, wherein the lower collision detector and the upper collision detector are formed by two-color molding.

9. The collision detection device according to claim 1, wherein, at a boundary between the lower collision detector and the upper collision detector, a surface of the lower collision detector and a surface of the upper collision detector are continuous with each other.

10. The collision detection device according to claim 2, wherein, at a boundary between the lower collision detector and the upper collision detector, a surface of the lower collision detector and a surface of the upper collision detector are continuous with each other.

11. The collision detection device according to claim 3, wherein, at a boundary between the lower collision detector and the upper collision detector, a surface of the lower collision detector and a surface of the upper collision detector are continuous with each other.

12. The collision detection device according to claim 4, wherein, at a boundary between the lower collision detector and the upper collision detector, a surface of the lower collision detector and a surface of the upper collision detector are continuous with each other.

13. The collision detection device according to claim 1, wherein the impact absorber includes
   an accommodation region recessed rearward from a front surface of the impact absorber and configured to accommodate the collision detector,
   an upper impact absorber that is included in the impact absorber and present above the accommodation region, and
   a lower impact absorber that is included in the impact absorber and present below the accommodation region.

14. The collision detection device according to claim 2, wherein the impact absorber includes
   an accommodation region recessed rearward from a front surface of the impact absorber and configured to accommodate the collision detector,
   an upper impact absorber that is included in the impact absorber and present above the accommodation region, and
   a lower impact absorber that is included in the impact absorber and present below the accommodation region.

15. The collision detection device according to claim 3, wherein the impact absorber includes
    an accommodation region recessed rearward from a front surface of the impact absorber and configured to accommodate the collision detector,
    an upper impact absorber that is included in the impact absorber and present above the accommodation region, and
    a lower impact absorber that is included in the impact absorber and present below the accommodation region.

16. The collision detection device according to claim 4, wherein the impact absorber includes
    an accommodation region recessed rearward from a front surface of the impact absorber and configured to accommodate the collision detector,
    an upper impact absorber that is included in the impact absorber and present above the accommodation region, and
    a lower impact absorber that is included in the impact absorber and present below the accommodation region.

17. The collision detection device according to claim 13, wherein, upon occurrence of minor collision of the vehicle, front ends of the upper impact absorber and the lower impact absorber are positioned in front of a front end of the collision detector.

18. The collision detection device according to claim 14, wherein, upon occurrence of minor collision of the vehicle, front ends of the upper impact absorber and the lower impact absorber are positioned in front of a front end of the collision detector.

19. The collision detection device according to claim 15, wherein, upon occurrence of minor collision of the vehicle, front ends of the upper impact absorber and the lower impact absorber are positioned in front of a front end of the collision detector.

20. The collision detection device according to claim 16, wherein, upon occurrence of minor collision of the vehicle, front ends of the upper impact absorber and the lower impact absorber are positioned in front of a front end of the collision detector.

* * * * *